S. P. & R. J. WENTZ.
Seed-Planter.
No. 223,970.  Patented Jan. 27, 1880.
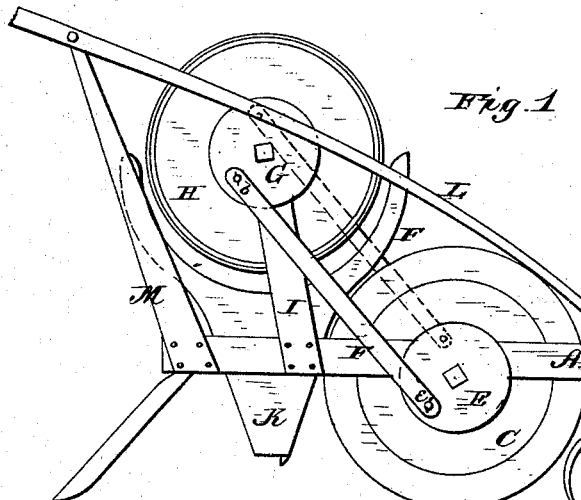
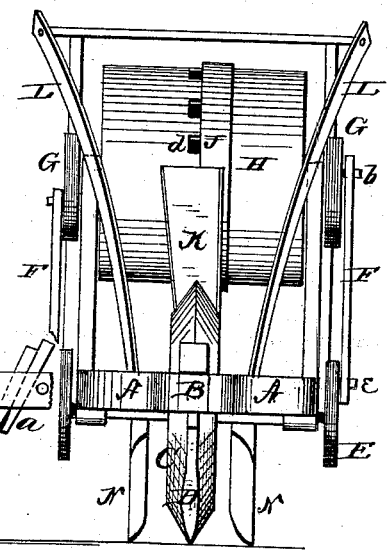
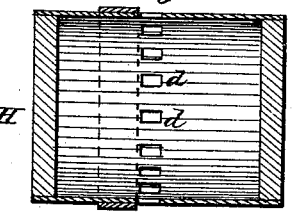
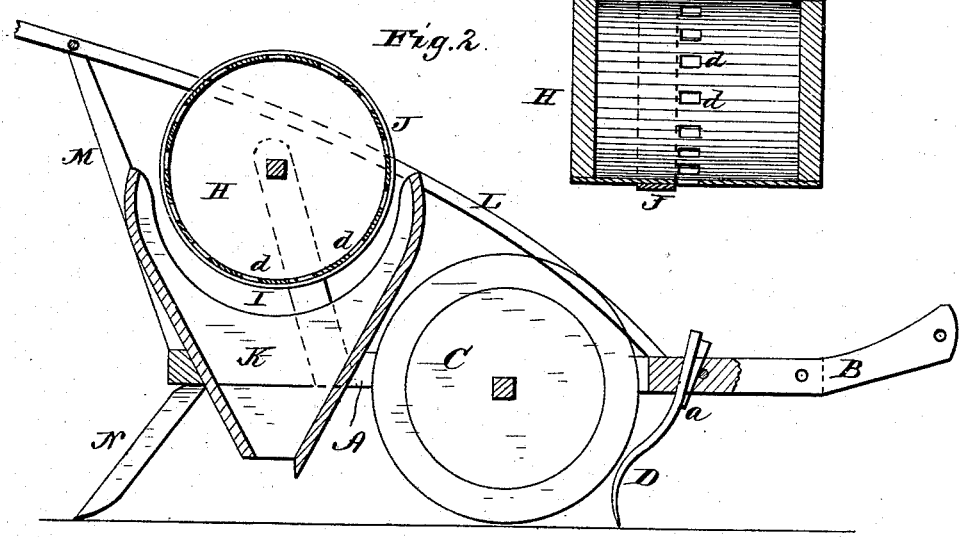
WITNESSES
INVENTOR
ATTORNEYS
N. PETERS, PHOTO-LITHOGRAPHER, WASHINGTON, D. C.

UNITED STATES PATENT OFFICE.

SIMON P. WENTZ AND RUFUS J. WENTZ, OF COBURN'S STORE, NORTH CAROLINA, ASSIGNORS TO T. A. CROWELL, OF BOSTON, MASSACHUSETTS, AND M. E. CROWELL, OF CHARLOTTE, NORTH CAROLINA.

SEED-PLANTER.

SPECIFICATION forming part of Letters Patent No. 223,970, dated January 27, 1880.

Application filed June 16, 1879.

*To all whom it may concern:*

Be it known that we, SIMON P. WENTZ and RUFUS J. WENTZ, of Coburn's Store, in the county of Union, and in the State of North Carolina, have invented certain new and useful Improvements in Seed-Planters; and we do hereby declare that the following is a full, clear, and exact description thereof, reference being had to the accompanying drawings, and to the letters of reference marked thereon, making a part of this specification.

The nature of our invention consists in the construction and arrangement of a cotton-seed planter, as will be hereinafter more fully set forth.

In order to enable others skilled in the art to which our invention appertains to make and use the same, we will now proceed to describe its construction and operation, referring to the annexed drawings, in which—

Figure 1 is a side elevation, and Fig. 2 a longitudinal vertical section, of our planter. Fig. 3 is a longitudinal section of the seed-cylinder. Fig. 4 is a front elevation of the entire machine.

The frame of our planter is composed of two parallel bars, A A, suitably connected at convenient distance apart, and provided at the front end with a projecting piece, B, to which the clevis is to be connected.

Between the bars A A is placed the driving-wheel C, which is formed with a beveled edge and runs in the furrow made by the curved furrow-opener D. This furrow-opener has its shank passed through a mortise in the frame in front of the wheel C, and fastened by a wedge-key, *a*, whereby it may be easily and quickly adjusted up or down, as may be required.

Upon each journal of the driving-wheel C is placed a disk, E, provided with a wrist-pin, *e*, and on this pin is placed a pitman, F, which connects with a similar wrist-pin, *b*, on a disk, G, the said disks G G being secured upon the journals of the seed drum or cylinder H, which journals are mounted in standards I I, firmly secured to the bars A A, as shown.

Circumferentially around the drum or cylinder H is a series of seed-openings, *d d*, through which the seed is to escape. The size of these seed-openings is regulated by means of a band, J, capable of lateral movement on the outside of the drum. This band may be held in any position by means of one or more set-screws passing through transverse slots in the band into the drum.

From the drum H the seed falls into a hopper-shaped conductor, K, secured to the frame below and independent of the drum, and is by the same conducted to the ground in the furrow behind the driving-wheel.

L L are the handles, secured to the bars A A and supported by braces M M, as shown. N is the coverer, following behind the conductor.

The wheel C, having a beveled edge, as described, makes the furrow in V form, or, in other words, forms the furrow with sloping sides, so that the seed will fall down on the same level in the bottom of the furrow.

By using two pitmen from the driving-wheel to the seed-cylinder there will be no side draft whatever, but the draft will be perfectly balanced and even on both sides.

We are aware that the individual features as shown in our machine may be found in other planters separately; but they have never been combined in one machine before. By such combination we have produced a simple, cheap, and durable machine, by which the furrow is opened and made in V shape with smooth sides, and the seed then dropped and covered up.

There is no side draft on the machine, but it runs perfectly straight.

Having thus fully described our invention, what we claim as new, and desire to secure by Letters Patent, is—

In a seed-planter, the beveled wheel C, having upon each journal a disk, E, with wrist-pin *e*, and two pitmen, F F, connecting with wrist-pins $b\ b$ on disks G G, secured on the two journals of the seed-cylinder H, in combination with the furrow-opener D, the hopper-shaped conductor K, and the seed-cylinder H, having laterally-adjustable regulating band or slide J, all constructed and arranged substantially as and for the purposes herein set forth.

In testimony that we claim the foregoing we have hereunto set our hands this 30th day of May, 1879.

SIMON PETER WENTZ.
RUFUS JOSIAH WENTZ.

Witnesses:
G. W. SCOTT,
N. M. BECKHAM.